US011934943B1

(12) United States Patent
Guo et al.

(10) Patent No.: US 11,934,943 B1
(45) Date of Patent: Mar. 19, 2024

(54) TWO-DIMENSIONAL PHOTONIC NEURAL NETWORK CONVOLUTIONAL ACCELERATION CHIP BASED ON SERIES CONNECTION STRUCTURE (71) Applicant: ZHEJIANG LAB, Hangzhou (CN)

(72) Inventors: Qingshui Guo, Hangzhou (CN); Kun Yin, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/237,839

(22) Filed: Aug. 24, 2023

(30) Foreign Application Priority Data

Sep. 2, 2022 (CN) .......................... 202211070007.1

(51) Int. Cl.
G06N 3/067 (2006.01)
G06N 3/049 (2023.01)
(52) U.S. Cl.
CPC ........... G06N 3/0675 (2013.01); G06N 3/049 (2013.01)
(58) Field of Classification Search
CPC .............................. G06N 3/0675; G06N 3/049
See application file for complete search history.

(56) References Cited

U.S. PATENT DOCUMENTS 11,057,143 B1 * 7/2021 Van Vaerenbergh .. G11C 15/00
11,469,764 B2 * 10/2022 Seyedi .................... H03K 17/78
(Continued)

FOREIGN PATENT DOCUMENTS

CN 109639359 4/2019
CN 110351073 5/2019
(Continued)

OTHER PUBLICATIONS

Wim Bogaerts, Peter De Heyn, Thomas Van Vaerenbergh, Katrien De Vos, Shankar Kumar Selvaraja, Tom Claes, Pieter Dumon, Peter Bienstman, Dries Van Thourhout, and Roel Baets. Silicon microring resonators. Laser Photonics Rev. 6, No. 1, 47-73 (2012) / DOI 10.1002/lpor.201100017. (Year: 2012).*

(Continued)

Primary Examiner — Collin X Beatty
(74) Attorney, Agent, or Firm — Jiwen Chen; Joywin IP Law PLLC (57) ABSTRACT The present invention discloses a two-dimensional photonic neural network convolutional acceleration chip based on series connection structure, which is integrated with a modulator, M microring delay weighting units, M-1 secondary delay waveguide, a wavelength-division multiplexer and a photodetector. Based on microring resonator arrays in M microring delay weighting units, the weighting of any convolution kernel matrix coefficient of the signal to be convolved is realized by the present invention, the refresh speed is fast, and real-time feedback training can be realized to extract the optimal convolution kernel matrix; in the present invention, realizing the primary wavelength-time interleaving of the sub weighted modulated signals with different wavelengths through the cascaded integrated waveguide between the microring resonators, realizing the secondary wavelength-time interleaving of sub-weighted modulated signals of different wavelengths by connecting the microring delay weighting units in series through the secondary delay waveguide, which can realize the delay multiplexing of the delay waveguide, comparing to parallel connection structure, it reduces the signal transmission loss caused by the delay waveguide while reducing the chip size, thereby improving the energy utilization efficiency of the chip.

9 Claims, 6 Drawing Sheets (56) References Cited

U.S. PATENT DOCUMENTS

| | | | |
|---|---|---|---|
| 2018/0217328 A1 | 8/2018 | Heroux et al. | |
| 2019/0370652 A1 | 12/2019 | Shen et al. | |
| 2020/0019851 A1 | 1/2020 | Mehrabian et al. | |
| 2021/0264241 A1* | 8/2021 | Karanth | G06N 3/045 |
| 2023/0274156 A1* | 8/2023 | Hamerly | G06N 3/084 |
| | | | 706/25 |

FOREIGN PATENT DOCUMENTS

| | | |
|---|---|---|
| CN | 111461317 | 7/2020 |
| CN | 111882052 | 11/2020 |
| CN | 113961035 | 1/2022 |
| CN | 114358271 | 4/2022 |
| CN | 114815959 | 7/2022 |
| CN | 114819089 | 7/2022 |
| CN | 114819132 | 7/2022 |
| WO | WO-2022164746 A1 * | 8/2022 |

OTHER PUBLICATIONS

Zheng Penggei et al. "Reconfigurable optical filter based on self-couple ring resonator assisted MZI structure", Optics and Precision Engineering, vol. 28, No. 1, Jan. 2020).

Zhang YM et al. "Photonic Generation of Linear-Frequency-Modulated Waveforms With Improved Time-Bandwidth Product Based on Polarization Modulation".

J. Lightwave Tech. vol. 35, No. 10, pp. 1821-1829 (2017).

Huang Yuyao, "Study on Programmable Time-Wavelength Interleaving Optical Neural Network", China Master Degree Excellent Theses, vol. 1, p. 1-54, (2022).

Xu X, et al, "11 TOPS Photonic convolutional accelerator for optical neural networks", Nature, vol. 589, pp. 44-51, Jan. 7, 2021.

Jiang Yue et al, "Photonic Convolution Neural Network Based on Interleaved Time-Wavelength Modulation", J. of Latex Class Files, vol. 14, No. 8, pp. 1-9, Aug. 2020.

* cited by examiner

TWO-DIMENSIONAL PHOTONIC NEURAL NETWORK CONVOLUTIONAL ACCELERATION CHIP BASED ON SERIES CONNECTION STRUCTURE

This application claims priority of Chinese Application No. 202211070007.1, filed Sep. 2, 2022, which is hereby incorporated by reference.

TECHNICAL FIELD

The present invention relates to the field of photonic integration technology, in particular to a two-dimensional photonic neural network convolutional acceleration chip based on series connection structure.

DESCRIPTION OF RELATED ART

Artificial intelligence is now widely used in the fields of machine vision, natural language processing, and automatic driving. Among them, artificial neural network, which is one of the important models of artificial intelligence technology, is widely used because of its excellent generalization ability and stability. Artificial neural networks essentially establish a similar neural network interconnection model by imitating the structure of the biological nervous system. Based on the mature development of electronic technology, mainstream neural network model training and testing mainly rely on electronic integrated chips as carriers, such as CPU, GPU, FPGA, and application specific integrated circuit. Since the current electronic chip adopts a classic computer structure that separates the program space from the data space, the data load between the storage unit and the computing unit is unstable and the power consumption is high, which limits the efficiency of network model training. Although computing efficiency can be improved by improving the integration of electronic chips or through memory computing, these technologies are also facing huge challenges due to the quantum characteristics and high-frequency response characteristics of electronic chips (see [1. Chen Hongwei, Yu Zhenming, Zhang Tian, etc. Advances and Challenges of Optical Neural Networks. Chinese Journal of Lasers, 2020, 47(5): 0500004.]). Photonic technology with photons as the information carriers has the characteristics of large bandwidth, low loss, and parallelism, it is widely used in radar, communications, and imaging fields. Combining photonic technology with traditional neural networks is expected to give full play to the advantages of both technologies and break through the technological development bottleneck of traditional electronic neural networks with high power consumption, long delay, and limited speed. (See[Shen Y, Harris N C, Skirlo S, et al. "Deep learning with coherent nanophotonic circuits", Nature Photonics, vol. 11, no. 7, pp. 441-446, 2017.]). First of all, the photonic neural network adopts an analog computing architecture, and the storage and computing are carried out at the same time, which can reduce the computing delay while increasing the computing speed; secondly, based on the essential characteristics of the optical transmission medium, the optical link has the characteristics of low loss, which can indirectly reduce the system power consumption; finally, compared with electronic devices, photonic devices, the effective working bandwidth has increased by several orders of magnitude, which is more suitable for the high-speed real-time computing of neural networks. For example, the scheme (see [Xu X, Tan M, Corcoran B, et al. "11 TOOS photonic convolutional accelerator for optical neural networks," Nature, vol. 589, no. 7840, pp. 45-51, 2021.]) proposes a convolution operation based on dispersion technology to realize the convolution of the signal to be convolved and a fully connected feedforward neural network, the computing speed is close to the latest chips based on electronic technology, but the power consumption of the scheme has been greatly reduced, providing a reliable basis for the photonic neural networks to move towards practicality. However, the above-mentioned scheme is mainly based on discrete optical modules, each optical module is large in size, and the waveform shaper of commercial instruments used in the scheme is difficult to integrate, resulting in the high cost of the scheme, which is difficult to be applied in ordinary commercial scenarios on a large scale.

Therefore, a two-dimensional photonic neural network convolutional acceleration chip based on series connection structure is proposed.

SUMMARY OF THE INVENTION

The object of the present invention is to provide a two-dimensional photonic neural network convolutional acceleration chip based on a series connection structure with photonic integration technology, in which, using microring resonator units containing primary delay waveguides to realize the convolution kernel matrix coefficient weighting, and the primary time-wavelength interleaving of the weighted modulated optical signal, and using the secondary delay waveguides to realize the secondary time-wavelength interleaving of the weighted modulated optical signal, solving the problem of data redundancy and delay waveguides that cannot be multiplexed in traditional methods, and it is suitable for multi-dimensional data convolution.

The technical solution adopted by the present invention is as follows:

A two-dimensional photonic neural network convolutional acceleration chip based on series connection structure, which is integrated with a modulator, M microring delay weighting units, M−1 secondary delay waveguide, a wavelength-division multiplexer and a photodetector; wherein, the modulator comprises an electrical input port, an optical input port and an optical output port, the optical input port of the modulator is used as the optical input port of the entire chip, and the optical input port of the modulator is used to receive the multi-wavelength optical signal; the optical output port of the modulator is connected to the optical input port of the first microring delay weighting unit; the electrical input port of the modulator is used to receive the signal to be convolved, and the modulator is used to modulate the signal to be convolved into the multi-wavelength optical signal, obtaining the multi-wavelength modulated optical signal containing M×N sub-modulated optical signals.

Each of the microring delay weighting unit is comprised of a straight-through waveguide, a coupled waveguide and N microring resonators, the N microring resonators are connected in series through the straight-through waveguide and the coupled waveguide; wherein the input port of the straight-through waveguide is used as the optical input port of the microring delay weighting unit, the output port of the coupled waveguide and the output port of the straight-through waveguide are respectively used as two optical output ports of the microring delay weighting unit; M microring delay weighting units are connected in series through M−1 secondary delay waveguides, the input port of the secondary delay waveguide is connected to the output port of the straight-through waveguide in the microring delay weighting unit before the secondary delay waveguide, and the output port of the secondary delay waveguide is connected to the input port of the straight-through waveguide in the microring delay weighting unit after the secondary delay waveguide; the coupling coefficient of the microring resonators in the M microring delay weighting units is controlled by the convolution kernel matrix control signal to realize the weighting of the multi-wavelength modulated optical signal containing M×N sub-modulated optical signals; Finally, at the output ports of the coupled waveguides of M microring delay weighting units, obtaining the weighted modulated optical signal each containing N wavelengths, respectively.

The wavelength-division multiplexer has M optical input ports and a single optical output port, the M optical input ports of the wavelength-division multiplexer are respectively connected to the output ports of the coupled waveguide in the M microring delay weighting units, and the optical output port of the wavelength-division multiplexer is connected to the optical input port of the photodetector; the M weighted modulated optical signals each containing N wavelengths input to the wavelength-division multiplexer are multiplexed into a composite multi-wavelength weighted modulated optical signal.

The optical input port of the photodetector for photoelectric conversion of the composite multi-wavelength weighted modulated optical signal to an electrical output signal is connected to the optical output port of the wavelength-division multiplexer, and the electrical output signal is sampled and processed to obtain the feature signal.

Furthermore, the coupling coefficients of the microring resonators in the M microring delay weighting units are controlled by the convolution kernel matrix control signal to realize the weighting of the multi-wavelength modulated optical signal containing M×N sub-modulated optical signals. The specific process is: starting from the first microring delay weighting unit, the coupling coefficients of the N adjacent microring resonators in the microring delay weighting unit are controlled according to the convolution kernel matrix control signal, and the N sub-modulated optical signals are sequentially coupled to the coupled waveguide according to different coupling coefficients to realize the weighting of the convolution kernel coefficients of the N sub-modulated optical signals, and the weighted modulated optical signal containing N wavelength of the first microring delay weighting unit is obtained at the output port of the coupled waveguide, the multi-wavelength optical signal containing (M−1)×N sub-modulated optical signals is obtained at the output port of the straight-through waveguide; the multi-wavelength optical signal containing (M−1)×N sub-modulated optical signals is fed to the optical input port of the second microring delay weighting unit after the first secondary delay waveguide delay to perform the same operation as the first microring delay weighting unit; and so on, the weighted modulated optical signal of the M-th microring delay weighting unit containing N wavelengths is obtained at the output port of the coupled waveguide of the M-th microring delay weighting unit.

Furthermore, the coupling coefficient of the microring resonators in the M microring delay weighting units is controlled by the convolution kernel matrix control signal, specifically:

the coupling coefficient of the microring resonators is determined according to the convolution kernel matrix coefficient and the initial signal strength of each wavelength in the multi-wavelength optical signal, and the coupling coefficient of the microring resonators is changed by the thermo-optical effect or electro-optical effect. The N microring resonators in each of the microring delay weighting units correspond to a row of coefficients in the convolution kernel matrix, and the M×N microring resonators in the M microring delay weighting units correspond to the two-dimensional convolution kernel matrix coefficients of size M×N.

Furthermore, the signal to be convolved is a one-dimensional time series obtained after the two-dimensional data to be convolved is flattened, and the two-dimensional data to be convolved is the original two-dimensional data obtained by matrix transformation. The specific transformation process is as follows:

the original two-dimensional data $A_{Q \times O}$ is divided into H sub-two-dimensional data $B_{Q \times P}$ by sliding in step P−N+1 in the column direction, each sub-two-dimensional data is a two-dimensional data to be convolved, where Q is the number of rows of the original two-dimensional data, O is the number of columns of the original two-dimensional data, P is the number of columns of the two-dimensional data matrix to be convolved, and N is the number of columns of the two-dimensional convolutional kernel matrix.

Furthermore, the N microring resonators in the microring delay weighting unit have a delay waveguide with a length of $\Delta l = c \times \Delta t / n_w$ between two adjacent microring resonators in the straight-through waveguide, where c is the speed of light in vacuum, $n_w$ is the effective refractive index of the delay waveguide, $\Delta t = 1/S_M$ is the duration of a single symbol of the signal to be convolved, $S_M$ is the symbol rate of the signal to be convolved, and the length of the secondary delay waveguide is $\Delta L = (P-N+1) \times c \times \Delta t / n_w$.

Furthermore, the radii of a total of M×N microring resonators in the M microring delay weighting units are not the same, each of the microring resonators corresponds to a resonance wavelength, and the free spectral range corresponding to the largest radius of the microring resonator $\Delta \lambda_{FSR}$ is greater than the spectral range occupied by the multi-wavelength optical signal M×N×$\Delta \lambda_{diff}$, $\Delta \lambda_{diff}$ is the wavelength spacing of the multi-wavelength optical signal.

Furthermore, the original two-dimensional data is obtained by decomposing three-dimensional or multi-dimensional original data.

Furthermore, the spectral response width of a single channel of the wavelength-division multiplexer is N×$\Delta \lambda_{diff}$, and the M optical input ports of the wavelength-division multiplexer correspond to M channels, and each channel corresponds to a weighted modulated optical signal with N wavelengths.

Furthermore, the chip is based on the III-V group material integration process, or silicon-based integration process.

Furthermore, the multi-wavelength optical signal is generated by a multi-wavelength laser, a mode-locked laser, a femtosecond laser, an optical frequency comb generator, or an optical soliton optical frequency comb generator.

The beneficial effects of the present invention are:
1. Based on a microring resonator array, the weighting of any convolution kernel matrix coefficient with the signal to be convolved is realized by the present invention, the scheme is simple and compact, the refresh speed is fast, and real-time feedback training can be realized to extract the optimal convolution kernel matrix, and the convolution operation speed is only limited to the speed of modulator.
2. The present invention realizes the primary wavelength-time interleaving of the sub weighted modulated signals with different wavelengths through the cascaded deley waveguide between the microring resonators, and the secondary wavelength-time interleaving of the sub weighted modulated signals with different wavelengths is realized by using the series secondary delay waveguide, the two-dimensional convolution kernel convolution acceleration operation of the two-dimensional data can be realized in a single signal cycle, solving the problem of data redundancy in the traditional method, and the scheme is simple and efficient.

3. The present invention realizes the secondary wavelength-time interleaving of sub-weighted modulated signals of different wavelengths by connecting the microring delay weighting unit in series through the secondary delay waveguide, which can realize the delay multiplexing with the delay waveguide, comparing to parallel connection, it reduces the signal transmission loss caused by the delay waveguide while reducing the chip size, thereby improving the energy utilization efficiency of the chip.

DETAILED DESCRIPTION OF THE INVENTION

The following description of at least one exemplary embodiment is actually only illustrative and does not serve as any limitation on the present invention and its application or use. Based on the embodiments in the present invention, all other embodiments obtained by ordinary technical personnel in the art without making creative labor fall within the scope of protection of the present invention.

Figure 1:
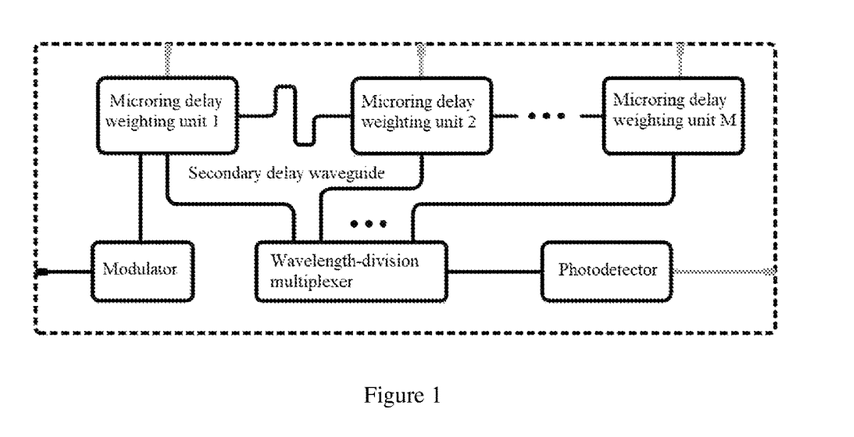
FIG. 1 is a schematic diagram of the structure of a two-dimensional photonic neural network convolutional acceleration chip based on series connection structure of the present invention.

As shown in FIG. 1, a two-dimensional photonic neural network convolutional acceleration chip based on series connection structure, which is integrated with a modulator, M microring delay weighting units, M−1 secondary delay waveguide, a wavelength-division multiplexer and a photodetector; wherein, The modulator comprises an electrical input port, an optical input port and an optical output port, the optical input port of the modulator is used as the optical input port of the entire chip, and the optical input port of the modulator is used to receive the multi-wavelength optical signal; the optical output port of the modulator is connected to the optical input port of the first microring delay weighting unit; the electrical input port of the modulator is used to receive the signal to be convolved, and the modulator is used to modulate the signal to be convolved into the multi-wavelength optical signal, obtaining the multi-wavelength modulated optical signal containing M×N sub-modulated optical signals.

The chip is based on the III-V group material integration process, or silicon-based integration process.

the multi-wavelength optical signal is generated by a multi-wavelength laser, a mode-locked laser, a femtosecond laser, an optical frequency comb generator, or an optical soliton optical frequency comb generator.

the signal to be convolved is a one-dimensional time series obtained after the two-dimensional data to be convolved is flattened, and the two-dimensional data to be convolved is the original two-dimensional data obtained by matrix transformation. The specific transformation process is:

the original two-dimensional data $A_{Q \times O}$ is divided into H sub-two-dimensional data $B_{Q \times P}$ by sliding in step P−N+1 in the column direction, each sub-two-dimensional data is a two-dimensional data to be convolved, where Q is the number of rows of the original two-dimensional data, O is the number of columns of the original two-dimensional data, P is the number of columns of the two-dimensional data matrix to be convolved, and N is the number of columns of the two-dimensional convolutional kernel matrix.

The original two-dimensional data is obtained by decomposing three-dimensional or multi-dimensional original data.

Each of the microring delay weighting unit is comprised of a straight-through waveguide, a coupled waveguide and N microring resonators, the N microring resonators are connected in series through the straight-through waveguide and the coupled waveguide; wherein the input port of the straight-through waveguide is used as the optical input port of the microring delay weighting unit, the output port of the coupled waveguide and the output port of the straight-through waveguide are respectively used as two optical output ports of the microring delay weighting unit; M microring delay weighting units are connected in series through M−1 secondary delay waveguides, the input port of the secondary delay waveguide is connected to the output port of the straight-through waveguide in the microring delay weighting unit before the secondary delay waveguide, and the output port of the secondary delay waveguide is connected to the input port of the straight-through waveguide in the microring delay weighting unit after the secondary delay waveguide; the coupling coefficient of the microring resonators in the M microring delay weighting units is controlled by the convolution kernel matrix control signal to realize the weighting of the multi-wavelength modulated optical signal containing M×N sub-modulated optical signals; Finally, at the output ports of the coupled waveguides in the M microring delay weighting units, obtaining the weighted modulated optical signal each containing N wavelengths, respectively.

The coupling coefficients of the microring resonators in the M microring delay weighting units are controlled by the convolution kernel matrix control signal to realize the weighting of the multi-wavelength modulated optical signal containing M×N sub-modulated optical signals. The specific process is: starting from the first microring delay weighting unit, the coupling coefficients of the N adjacent microring resonators in the microring delay weighting unit are controlled according to the convolution kernel matrix control signal, and the N sub-modulated optical signals are sequentially coupled to the coupled waveguide according to different coupling coefficients to realize the weighting of the convolution kernel coefficients of the N sub-modulated optical signals, and the weighted modulated optical signal containing N wavelength of the first microring delay weighting unit is obtained at the output port of the coupled waveguide, the multi-wavelength optical signal containing (M−1)×N sub-modulated optical signals is obtained at the output port of the straight-through waveguide; the multi-wavelength optical signal containing (M−1)×N sub-modulated optical signals is fed to the optical input port of the second microring delay weighting unit after the first secondary delay waveguide delay to perform the same operation as the first microring delay weighting unit; and so on, the weighted modulated optical signal of the M-th microring delay weighting unit containing N wavelengths is obtained at the output port of the coupled waveguide of the M-th microring delay weighting unit.

The coupling coefficient of the microring resonators in the M microring delay weighting units is controlled by the convolution kernel matrix control signal, specifically:

the coupling coefficient of the microring resonators is determined according to the convolution kernel matrix coefficient and the initial signal strength of each wavelength in the multi-wavelength optical signal, and the coupling coefficient of the microring resonators is changed by the thermo-optical effect or electro-optical effect. The N microring resonators in each of the microring delay weighting units correspond to a row of coefficients in the convolution kernel matrix, and the M×N microring resonators in the M microring delay weighting units correspond to the two-dimensional convolution kernel matrix coefficients of size M×N.

The N microring resonators in the microring delay weighting unit have a delay waveguide with a length of $\Delta l = c \times \Delta t / n_w$ between two adjacent microring resonators in the straight-through waveguide ports, where c is the speed of light in vacuum, $n_w$ is the effective refractive index of the delay waveguide, $\Delta t = 1/S_M$ is the duration of a single symbol of the signal to be convolved, $S_M$ is the symbol rate of the signal to be convolved, and the length of the secondary delay waveguide is $\Delta L = (P-N+1) \times c \times \Delta t / n_w$.

The radii of a total of M×N microring resonators in the M microring delay weighting units are not the same, each of the microring resonators corresponds to a resonance wavelength, and the free spectral range corresponding to the largest radius of the microring resonator $\Delta \lambda_{FSR}$ is greater than the spectral range occupied by the multi-wavelength optical signal M×N×$\Delta \lambda_{diff}$, $\Delta \lambda_{diff}$ is the wavelength spacing of the multi-wavelength optical signal.

The wavelength-division multiplexer has M optical input ports and a single optical output port, the M optical input ports of the wavelength-division multiplexer are respectively connected to the output ports of the coupled waveguide in the M microring delay weighting units, and the optical output port of the wavelength-division multiplexer is connected to the optical input port of the photodetector; the M weighted modulated optical signals each containing N wavelengths input to the wavelength-division multiplexer are multiplexed into a composite multi-wavelength weighted modulated optical signal.

the spectral response width of a single channel of the wavelength-division multiplexer is N×$\Delta \lambda_{diff}$, and the M optical input ports of the wavelength-division multiplexer correspond to M channels, and each channel corresponds to a weighted modulated optical signal containing N wavelengths.

The optical input port of the photodetector for photoelectric conversion of the composite multi-wavelength weighted modulated optical signal to an electrical output signal is connected to the optical output port of the wavelength-division multiplexer, and the electrical output signal is sampled and processed to obtain the feature signal.

Figure 2:
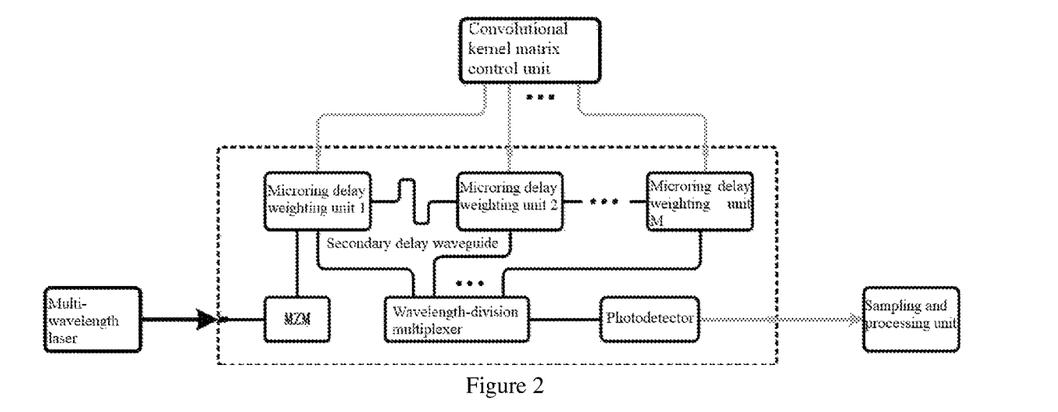
FIG. 2 is a schematic diagram of the structure of a specific embodiment of the two-dimensional photonic convolutional acceleration chip of the present invention.
Figure 4:
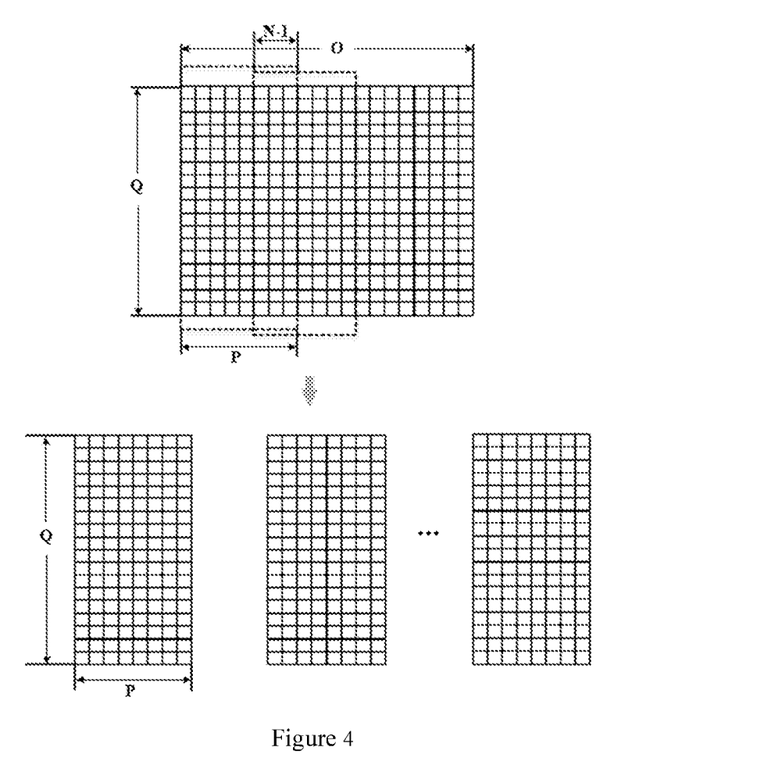
FIG. 4 is a schematic diagram of the matrix transformation process from the original two-dimensional data to the two-dimensional data to be convolved in a specific embodiment of the two-dimensional photonic convolutional acceleration chip of the present invention.
Figure 5:
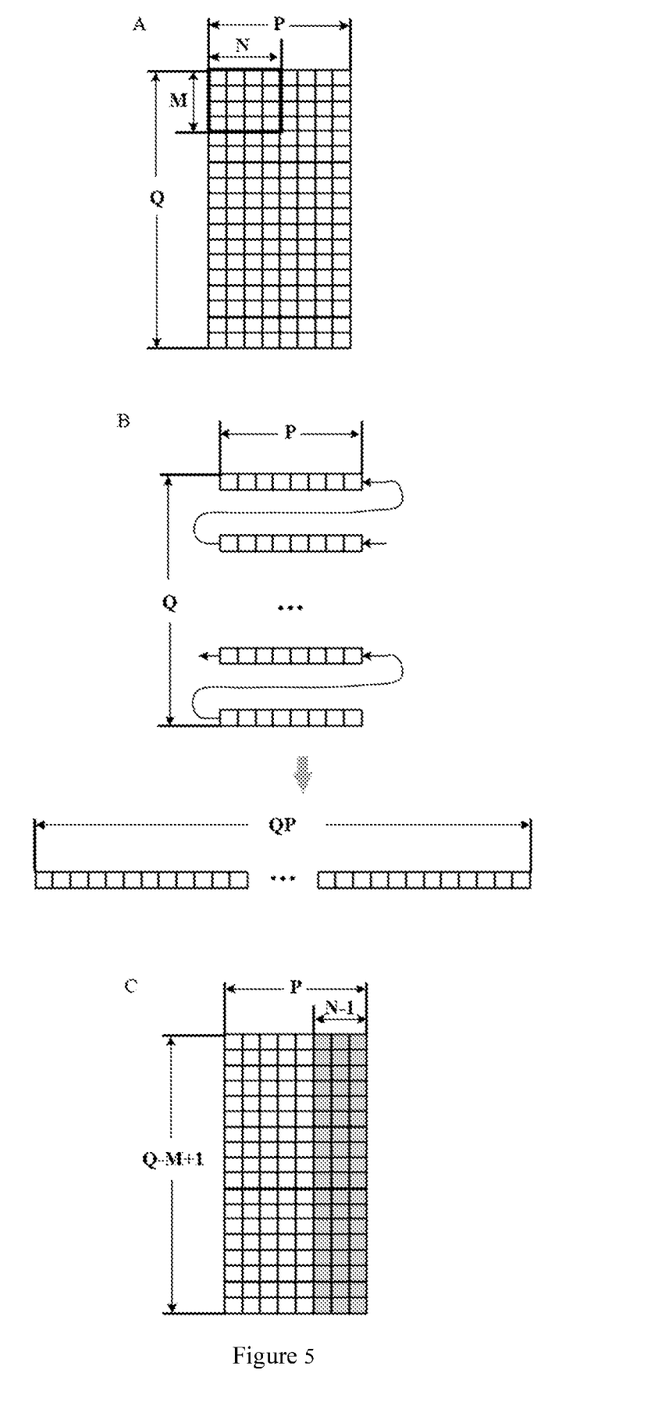
FIG. 5 is a schematic diagram of the flattening processing of the two-dimensional convolutional data matrix in a specific embodiment of the two-dimensional photonic convolution acceleration chip of the present invention.

As shown in FIG. 2, in this embodiment, the multi-wavelength optical signal is generated by a multi-wavelength laser, the modulator uses a Mach-Zehnder modulator (MZM). Firstly, the multi-wavelength laser outputs the multi-wavelength optical signal containing M×N wavelength with equal intensities, expressed in a matrix as $A=[A,A,A, \ldots ,A]^T_{MN \times 1}$, where M and N are positive integers, corresponding to the number of rows and columns of the convolution kernel matrix, respectively, and A is the intensity of a single-wavelength optical signal. The multi-wavelength optical signal is fed into the optical input port of the Mach-Zehnder modulator (MZM) of the photonic chip through fiber-waveguide coupling technology, and the multi-wavelength optical signal is modulated by the signal to be convolved output from the signal source to be convolved through the Mach-Zehnder modulator (MZM), and the signal to be convolved is loaded into different wavelengths of the multi-wavelength optical signal. The signal sequence to be convolved is expressed as $x(i)=[x(1),x(2),x(3), \ldots ,x(R)]$, where i represents the discretization time sequence, and R=Q×P is the length of the signal to be convolved, the signal to be convolved is a one-dimensional time series obtained after the two-dimensional data to be convolved being flattened, and the two-dimensional data to be convolved is the original two-dimensional data which is obtained through matrix transformation, the specific transformation process is shown in FIG. 4, the original two-dimensional data $A_{Q \times O}$ is segmented into H sub-two-dimensional data $B_{Q \times P}$ in the column direction by sliding in step P−N+1, each sub two-dimensional data is a two-dimensional data to be convolved, where Q is the number of rows of the original two-dimensional data, O is the number of columns of the original two-dimensional data, P is the number of columns of the two-dimensional data matrix to be convolved, and N is the number of columns of the two-dimensional convolutional kernel matrix. The two-dimensional signal matrix to be convolved is shown in A of FIG. 5, which is a matrix of Q rows and P columns. The specific operation of matrix flattening is to convert a two-dimensional or multi-dimensional matrix into a one-dimensional matrix, the process is shown in B of FIG. 5. Each intensity modulated carrier corresponds to a signal to be convolved, resulting in the multi-wavelength modulated optical signal, the multi-wavelength modulated optical signal Shod is expressed by a matrix:

$$S_{Mod} = Ax(i) = \begin{bmatrix} Ax(i) \\ Ax(i) \\ ... \\ Ax(i) \end{bmatrix}_{MN \times 1} = \begin{bmatrix} Ax(1) & Ax(2) & ... & Ax(R) \\ Ax(1) & Ax(2) & ... & Ax(R) \\ ... \\ Ax(1) & Ax(2) & ... & Ax(R) \end{bmatrix}_{MN \times R} \quad (1)$$

Figure 3:
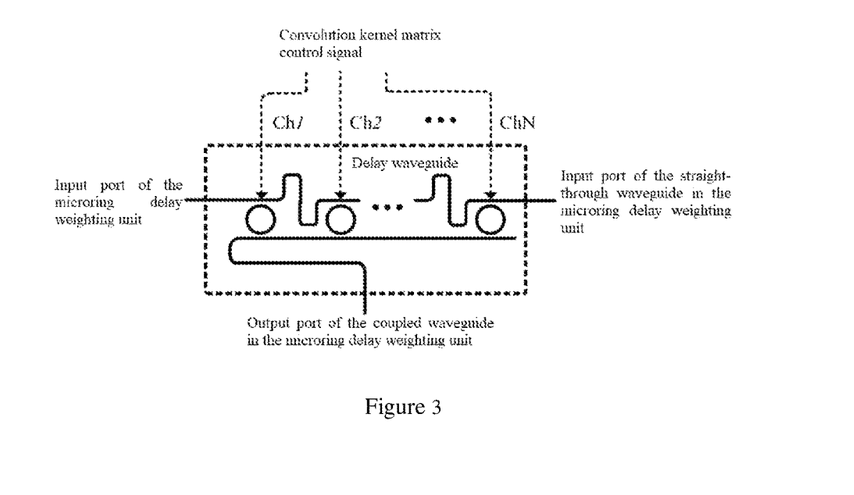
FIG. 3 is a schematic diagram of the structure of the microring delay weighting unit in a specific embodiment of the two-dimensional photonic convolutional acceleration chip of the present invention.
Figure 6:
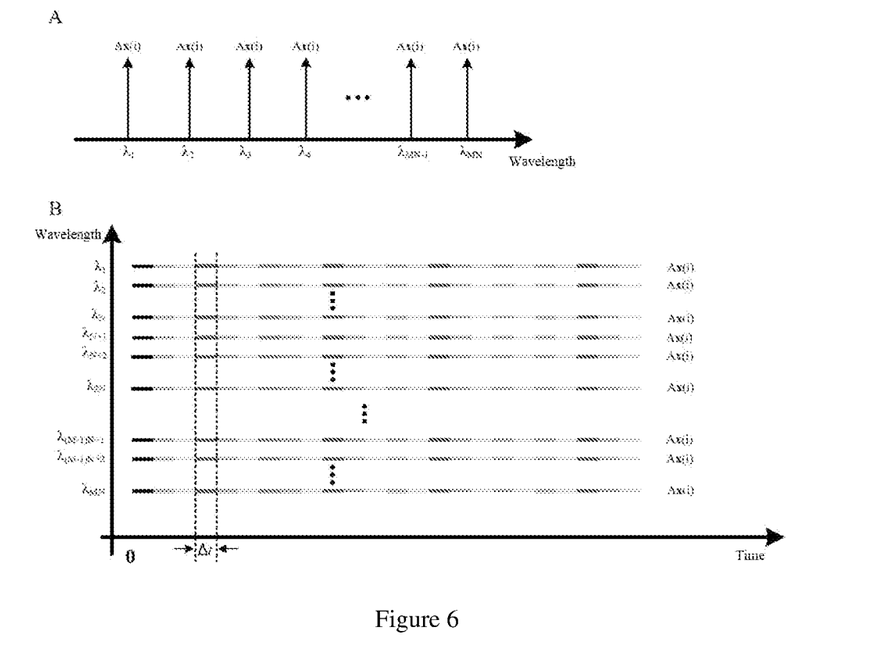
FIG. 6 is a schematic diagram of the output signal of the modulator in a specific embodiment of the two-dimensional photonic convolutional acceleration chip of the present invention; wherein A is the spectral distribution of the multi-wavelength intensity modulated optical signal, and B is the relationship diagram between time series and wavelength of the multi-wavelength intensity modulated optical signal.

The corresponding spectral distribution is shown in A of FIG. 6, and the relationship between time series and wavelength diagram of the sub-modulated optical signals corresponding to different wavelengths are shown in B of FIG. 6. The multi-wavelength modulated optical signal output by the Mach-Zehnder modulator (MZM) is sequentially fed into M microring delay weighting units connected in series through the secondary delay waveguide. The schematic diagram of the structure of the microring delay weighting unit is shown in FIG. 3, each microring delay weighting unit comprises one straight-through waveguide, one coupled waveguide and N microring resonators, the N microring resonators have a delay waveguide with a length of $\Delta l = c \times \Delta t/n_w$ between two adjacent microring resonators in the straight-through waveguide, where c is the speed of light in vacuum, $n_w$ is the effective refractive index of the delay waveguide, $\Delta t = 1/S_M$ is the duration of a single symbol of the signal to be convolved, $S_M$ is the symbol rate of the signal to be convolved, and the length of the secondary delay waveguide is $\Delta L = (P-N+1) \times c \times \Delta t/n_w$. The resonance characteristics of the N microrings in each delay weighting unit correspond to one wavelength in turn, the coupling coefficient of the microring resonators is determined according to the convolution kernel matrix coefficient and the initial signal strength of each wavelength in the multi-wavelength optical signal, and the coupling coefficient of the microring resonators is changed by the thermo-optical effect or electro-optical effect, the N microring resonators in each microring delay weighting units correspond to a row of coefficients in the convolution kernel matrix. The convolutional kernel matrix control signal output by the convolutional kernel matrix control unit first controls the resonance characteristics of the first microring resonator, so that the corresponding wavelength sub-intensity modulated optical signal transmitted in the straight-through waveguide is coupled to the coupled waveguide according to a specific coupling coefficient, and the convolutional kernel matrix coefficient weighting is realized. The sub multi-wavelength modulated optical signal in the straight-through waveguide passes through the first microring resonator and enters the delay waveguide of the straight-through waveguide to achieve $\Delta t$ delay, the multi-wavelength intensity modulated optical signal after the delay is passed through the second microring resonator to achieve coefficient weighting of the corresponding wavelength signal, and all wavelength signal weighting is completed sequentially after the delay. The N sub-weighted intensity modulated optical signals are obtained at the output port of the coupled waveguide, and the convolution kernel matrix coefficient $M_{con}$ is expressed as:

$$M_{con} = \begin{bmatrix} w_{11} & w_{12} & ... & w_{1N} \\ w_{21} & w_{22} & ... & w_{2N} \\ ... \\ w_{M1} & w_{M2} & ... & w_{MN} \end{bmatrix}_{M \times N} \quad (2)$$

Wherein, w represents the convolution kernel matrix element; the sub-weighted modulated optical signals $S_{Modcon\_1}$ output by the coupled waveguide in the first microring delay weighting unit is expressed as:

$$S_{Modcon\_1} = \begin{bmatrix} Ax(i)w_{11} & 0 & & 0 \\ 0 & Ax(i-1)w_{12} & & 0 \\ ... & & & \\ 0 & ... & 0 & Ax(i)w_{11} \end{bmatrix}_{N \times (N1)} \quad (3)$$

Figure 7:
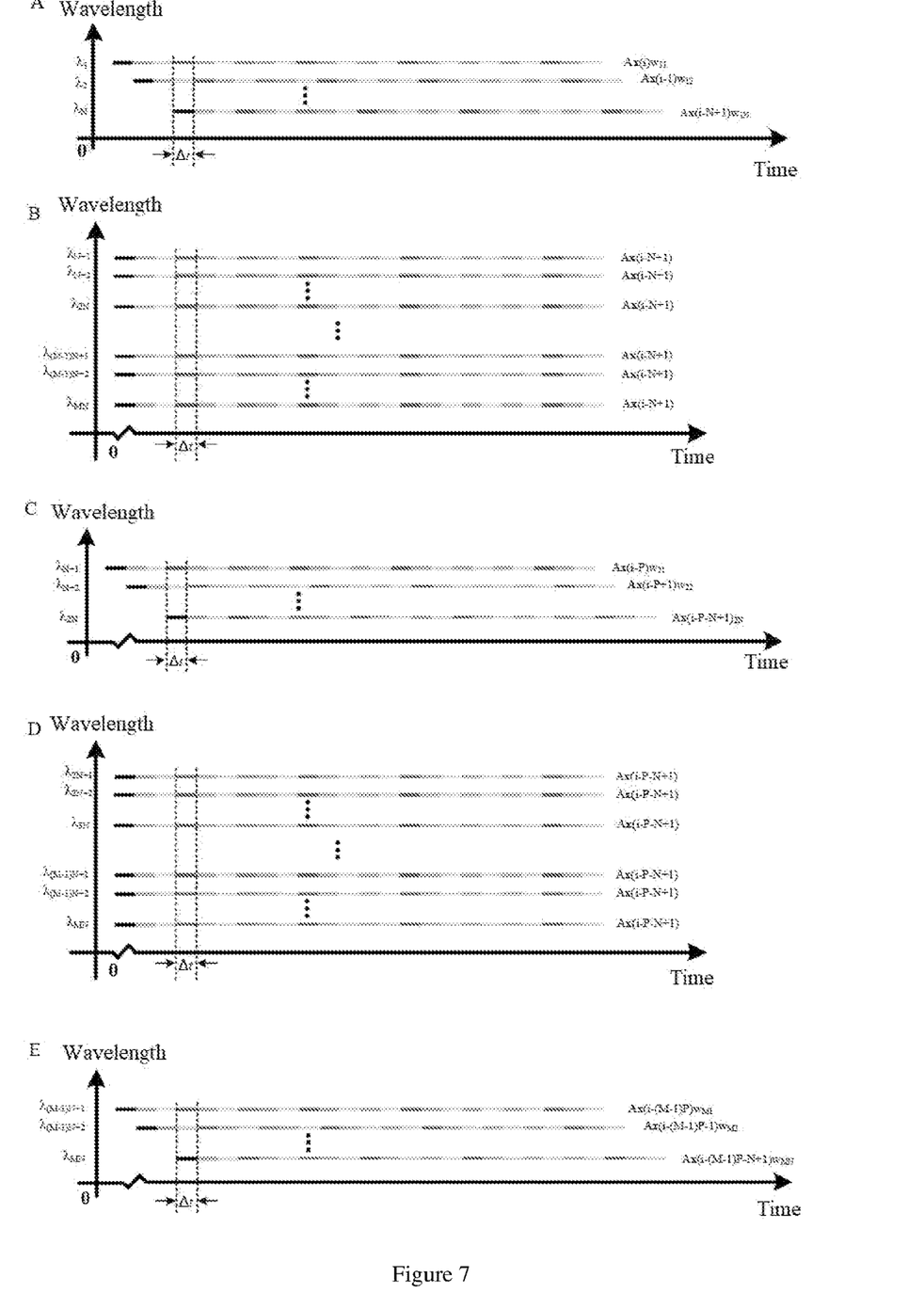
FIG. 7 is relationship diagrams between time series and wavelength of each working node in a specific embodiment of the two-dimensional photonic convolutional acceleration chip of the present invention.

The relationship diagram between time series and wavelength of the sub-weighted modulated optical signals output by the coupled waveguide in the first microring delay weighting unit is shown in A of FIG. 7, and the relationship diagram between time series and wavelength of the multi-wavelength optical signal containing (M−1)×N sub-modulated optical signal obtained at the output port of the straight-through waveguide as shown in B of FIG. 7. The multi-wavelength optical signal output by the first microring delay weighting unit is fed into the secondary delay waveguide with a length of $\Delta L = (P-N+1) \times c \times \Delta t/n_w$ to achieve the secondary delay, and the multi-wavelength optical signal after the secondary delay is fed into the second microring delay weighting unit for the same operation as in the first microring delay weighting unit, the relationship diagram between time series and wavelength of the sub-weighted modulated optical signals output by the coupled waveguide in the second microring delay weighting unit is shown in C of FIG. 7, and the relationship diagram between time series and wavelength of the multi-wavelength optical signal containing (M−2)×N sub-modulated optical signals obtained at the output port of the straight-through waveguide is shown in D of FIG. 7. Performing the same operation in the subsequent series connected microring delay weighting unit and secondary delay waveguide until the last microring delay weighting unit. The relationship diagram between time series and wavelength of the sub weighted modulated optical signals output by the coupled waveguide of the last microring delay weighting unit is shown in E of FIG. 7. The sub weighted modulated optical signals $S_{Modcon\_m}$ output by the coupled waveguide of the microring delay weighted unit is represented as:

$$S_{Modcon\_m} = \begin{bmatrix} Ax(i-(m-1)P)w_{m1} & 0 & & 0 \\ 0 & Ax(i-(m-1)P-1)w_{m2} & & 0 \\ ... & & & \\ 0 & ... & 0 & Ax(i-(m-1)P-N+1)w_{mN} \end{bmatrix}_{N \times (N-1)} \quad (4)$$

$$(m = 1, 2, ..., M)$$

Figure 8:
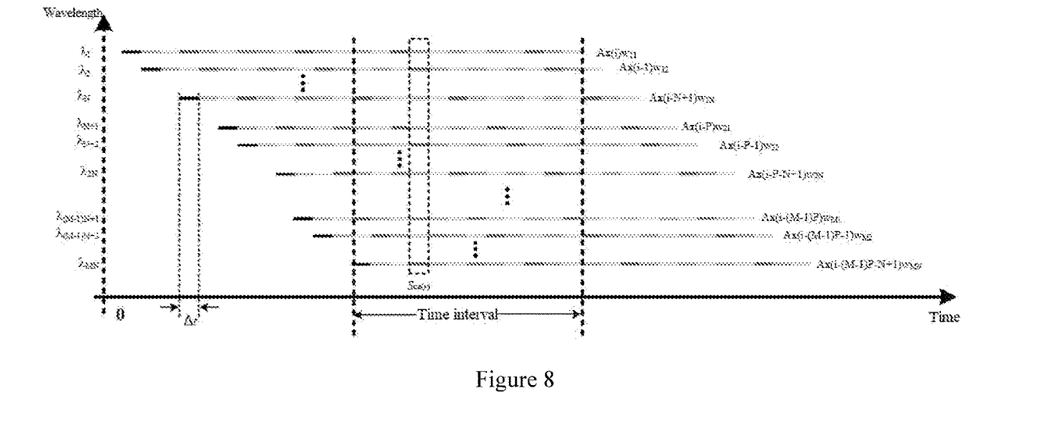
FIG. 8 is a relationship diagram between time series and wavelength of composite multi-wavelength weighted modulated optical signal output by the wavelength-division multiplexer in a specific embodiment of the two-dimensional photonic convolutional acceleration chip of the present invention.

The sub-weighted modulated optical signals output by the M microring delay weighting units are fed to the M optical input ports of the wavelength-division multiplexer and multiplexed into a composite multi-wavelength weighted modulated optical signal, the relationship diagram between time series and wavelength of the composite multi-wavelength weighted modulated optical signal are shown in FIG. 8. The composite multi-wavelength weighted modulated optical signal is input to the photodetector through the waveguide to achieve photoelectric conversion, and the electrical output signal of the two-dimensional photonic convolutional acceleration chip is obtained, the signal within the effective time interval of the electrical output signal is expressed as:

$$S_{ca}(r) \propto \sum_{m=1}^{m=M} \sum_{n=1}^{n=N} Ax(r + N - n + (m-1)P)w_{mn} \quad (5)$$

Among them, $S_{ca}(r)$ is the result of the rth convolution operation, and $w_{mn}$ is the convolution kernel matrix coefficient. After the sampling and processing unit sample the signal, the effective time interval signal can be reconstructed in two dimensions in the digital domain by matrix flattening in the opposite way, the two-dimensional reconstructed data is shown in C of FIG. 5, where the gray N−1 is listed as redundant data. After removing the redundant data, the two-dimensional feature signal can be obtained after the convolution operation is completed by the two-dimensional convolution signal. The above process is a specific embodiment description when the original data is not filled with zero. When the original data is filled with zero, the data with zero can be used as the original two-dimensional data for performing the same operation as above.

Figure 9:
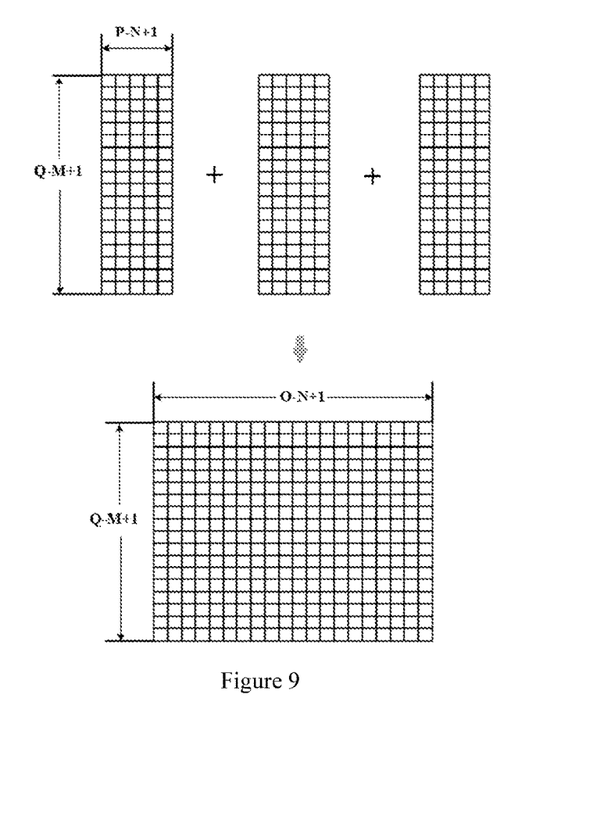
FIG. 9 is a schematic diagram of the matrix transformation process of the two-dimensional feature data to the original two-dimensional feature data in a specific embodiment of the two-dimensional photonic convolutional acceleration chip of the present invention.

Finally, the H two-dimensional feature signals are combined into a feature signal corresponding to the original two-dimensional data through the method shown in FIG. 9, and then the convolution operation of the original two-dimensional data is completed.

The above is only a preferred embodiment of the present invention and is not intended to limit the present invention. For technical personnel in the art, the present invention may have various changes and variations. Any modification, equivalent replacement, improvement, etc. made within the spirit and principles of the present invention shall be included within the scope of protection of the invention.

The invention claimed is:

1. A two-dimensional photonic neural network convolutional acceleration chip based on series connection structure, which is integrated with a modulator, M microring delay weighting units, M−1 secondary delay waveguide, a wavelength-division multiplexer and a photodetector; wherein, the modulator comprises an electrical input port, an optical input port and an optical output port, the optical input port of the modulator is used as the optical input port of the entire chip, and the optical input port of the modulator is used to receive a multi-wavelength optical signal; the optical output port of the modulator is connected to the optical input port of a first microring delay weighting unit; the electrical input port of the modulator is used to receive the signal to be convolved, and the modulator is used to modulate the signal to be convolved into the multi-wavelength optical signal, obtaining a multi-wavelength modulated optical signal containing M×N sub-modulated optical signals;

each of the microring delay weighting unit is comprised of a straight-through waveguide, a coupled waveguide and N microring resonators, the N microring resonators are connected in series through the straight-through waveguide and the coupled waveguide; wherein the input port of the straight-through waveguide is used as the optical input port of the microring delay weighting unit, the output port of the coupled waveguide and the output port of the straight-through waveguide are respectively used as two optical output ports of the microring delay weighting unit; M microring delay weighting units are connected in series through M−1 secondary delay waveguides, the input port of the secondary delay waveguide is connected to the output port of the straight-through waveguide in the microring delay weighting unit before the secondary delay waveguide, and the output port of the secondary delay waveguide is connected to the input port of the straight-through waveguide in the microring delay weighting unit after the secondary delay waveguide; the coupling coefficients of the microring resonators in the M microring delay weighting units are controlled by the convolution kernel matrix control signal to realize the weighting of the multi-wavelength modulated optical signal containing M×N sub-modulated optical signals, the specific process is: starting from the first microring delay weighting unit, the coupling coefficients of the N adjacent microring resonators in the microring delay weighting unit are controlled according to the convolution kernel matrix control signal, and the N sub-modulated optical signals are sequentially coupled to the coupled waveguide according to different coupling coefficients to realize the weighting of the convolution kernel coefficients of the N sub-modulated optical signals, and the weighted modulated optical signal containing N wavelength of the first microring delay weighting unit is obtained at the output port of the coupled waveguide, the multi-wavelength optical signal containing (M−1)×N sub-modulated optical signals is obtained at the output port of the straight-through waveguide; the multi-wavelength optical signal containing (M−1)×N sub-modulated optical signals is fed to the optical input port of the second microring delay weighting unit after the first secondary delay waveguide delay to perform the same operation as the first microring delay weighting unit; and so on, the weighted modulated optical signal of the M-th microring delay weighting unit containing N wavelengths is obtained at the output port of the coupled waveguide of the M-th microring delay weighting unit; finally, at the output ports of the coupled waveguides of M microring delay weighting units, obtaining the weighted modulated optical signal each containing N wavelengths, respectively;

the wavelength-division multiplexer has M optical input ports and a single optical output port, the M optical input ports of the wavelength-division multiplexer are respectively connected to the output ports of the coupled waveguide in the M microring delay weighting units, and the optical output port of the wavelength-division multiplexer is connected to the optical input port of the photodetector; that the M weighted modulated optical signals each containing N wavelengths input to the wavelength-division multiplexer are multiplexed into a composite multi-wavelength weighted modulated optical signal;

the optical input port of the photodetector for photoelectric conversion of the composite multi-wavelength weighted modulated optical signal to an electrical output signal is connected to the optical output port of the wavelength-division multiplexer, and the electrical output signal is sampled and processed to obtain the feature signal.

2. The two-dimensional photonic neural network convolutional acceleration chip based on series connection structure according to claim 1, wherein, the coupling coefficient of the microring resonators in the M microring delay weighting units is controlled by the convolution kernel matrix control signal, specifically:

the coupling coefficient of the microring resonators is determined according to the convolution kernel matrix coefficient and the initial signal strength of each wavelength in the multi-wavelength optical signal, and the coupling coefficient of the microring resonators is changed by the thermo-optical effect or electro-optical effect; the N microring resonators in each of the microring delay weighting units correspond to a row of coefficients in the convolution kernel matrix, and the M×N microring resonators in the M microring delay weighting units correspond to the two-dimensional convolution kernel matrix coefficients of size M×N.

3. The two-dimensional photonic neural network convolutional acceleration chip based on series connection structure according to claim 1, wherein, the signal to be convolved is a one-dimensional time series obtained after the two-dimensional data to be convolved being flattened, and the two-dimensional data to be convolved is the original two-dimensional data obtained by matrix transformation, the specific transformation process is:

the original two-dimensional data $A_{Q \times O}$ is divided into H sub-two-dimensional data $B_{Q \times P}$ by sliding in step P−N+1 in the column direction, each sub-two-dimensional data is a two-dimensional data to be convolved, where Q is the number of rows of the original two-dimensional data, O is the number of columns of the original two-dimensional data, P is the number of columns of the two-dimensional data matrix to be convolved, and N is the number of columns of the two-dimensional convolutional kernel matrix.

4. The two-dimensional photonic neural network convolutional acceleration chip based on series connection structure according to claim 1, wherein, the N microring resonators in the microring delay weighting unit have a delay waveguide with a length of $\Delta l = c \times \Delta t / n_w$ between two adjacent microring resonators in the straight-through waveguide, where c is the speed of light in vacuum, $n_w$ is the effective refractive index of the delay waveguide, $\Delta t = 1/S_M$ is the duration of a single symbol of the signal to be convolved, $S_M$ is the symbol rate of the signal to be convolved, and the length of the secondary delay waveguide is $\Delta L = (P-N+1) \times c \times \Delta t / n_w$.

5. The two-dimensional photonic neural network convolutional acceleration chip based on series connection structure according to claim 1, wherein, the radii of a total of M×N microring resonators in the M microring delay weighting units are not the same, each of the microring resonators corresponds to a resonance wavelength, and the free spectral range corresponding to the largest radius of the microring resonator $\Delta \lambda_{FSR}$ is greater than the spectral range occupied by the multi-wavelength optical signal M×N×$\Delta \lambda_{diff}$, $\Delta \lambda_{diff}$ is the wavelength spacing of the multi-wavelength optical signal.

6. The two-dimensional photonic neural network convolutional acceleration chip based on series connection structure according to claim 3, wherein, the original two-dimensional data is obtained by decomposing three-dimensional or multi-dimensional original data.

7. The two-dimensional photonic neural network convolutional acceleration chip based on series connection structure according to claim 1, wherein, the spectral response width of a single channel of the wavelength-division multiplexer is N×$\Delta \lambda_{diff}$, and the M optical input ports of the wavelength-division multiplexer correspond to M channels, and each channel corresponds to a weighted modulated optical signal with N wavelengths.

8. The two-dimensional photonic neural network convolutional acceleration chip based on series connection structure according to claim 1, wherein, the chip is based on the III-V group material integration process, or silicon-based integration process.

9. The two-dimensional photonic neural network convolutional acceleration chip based on series connection structure according to claim 1, wherein, the multi-wavelength optical signal is generated by a multi-wavelength laser, a mode-locked laser, a femtosecond laser, an optical frequency comb generator, or an optical soliton optical frequency comb generator.

* * * * *